(12) United States Patent
Seguine

(10) Patent No.: US 8,159,462 B1
(45) Date of Patent: Apr. 17, 2012

(54) REFERENCE VOLTAGE OFFSET FOR CAPACITIVE TOUCH-SENSOR MEASUREMENT

(75) Inventor: Ryan D. Seguine, Everett, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1049 days.

(21) Appl. No.: 11/600,896

(22) Filed: Nov. 15, 2006

(51) Int. Cl.
*G06F 3/41* (2006.01)

(52) U.S. Cl. ........................ 345/173; 345/178

(58) Field of Classification Search .......... 345/156–184; 324/204, 637, 686, 690, 678, 672; 33/125, 33/143, 147; 178/18.06, 18.03; 341/33; 315/224

See application file for complete search history.

(56) References Cited

U.S. PATENT DOCUMENTS

| | | | | |
|---|---|---|---|---|
| 3,979,745 A | * | 9/1976 | Bishop | 341/140 |
| 4,238,711 A | * | 12/1980 | Wallot | 315/324 |
| 4,586,260 A | * | 5/1986 | Baxter et al. | 33/706 |
| 4,825,147 A | * | 4/1989 | Cook et al. | 324/678 |
| 5,089,783 A | * | 2/1992 | Kapsokavathis et al. | 324/672 |
| 5,386,219 A | * | 1/1995 | Greanias et al. | 345/174 |
| 6,191,723 B1 | * | 2/2001 | Lewis | 341/166 |
| 6,377,129 B1 | * | 4/2002 | Rhee et al. | 331/111 |
| 6,490,203 B1 | * | 12/2002 | Tang | 365/185.22 |
| 6,577,140 B1 | * | 6/2003 | Wenman | 324/637 |
| 6,838,887 B2 | * | 1/2005 | Denen et al. | 324/686 |
| 7,030,569 B2 | * | 4/2006 | Gray | 315/224 |
| 7,253,643 B1 | * | 8/2007 | Seguine | 324/686 |
| 7,301,350 B2 | * | 11/2007 | Hargreaves et al. | 324/678 |
| 7,375,535 B1 | * | 5/2008 | Kutz et al. | 324/658 |
| 7,381,031 B2 | * | 6/2008 | Kawaguchi et al. | 417/222.2 |
| 7,945,297 B2 | * | 5/2011 | Philipp | 455/575.2 |
| 2002/0109035 A1 | * | 8/2002 | Denen et al. | 242/559.1 |
| 2002/0140440 A1 | * | 10/2002 | Haase | 324/678 |
| 2004/0217945 A1 | * | 11/2004 | Miyamoto et al. | 345/173 |
| 2005/0093476 A1 | * | 5/2005 | Gray | 315/224 |
| 2005/0169768 A1 | * | 8/2005 | Kawaguchi et al. | 417/222.2 |
| 2006/0119285 A1 | * | 6/2006 | Gray | 315/224 |
| 2007/0076897 A1 | * | 4/2007 | Philipp | 381/74 |
| 2007/0268265 A1 | * | 11/2007 | XiaoPing | 345/173 |
| 2007/0296709 A1 | * | 12/2007 | GuangHai | 345/173 |
| 2008/0007534 A1 | * | 1/2008 | Peng et al. | 345/173 |
| 2008/0024455 A1 | * | 1/2008 | Lee et al. | 345/173 |
| 2008/0036473 A1 | * | 2/2008 | Jansson | 324/678 |
| 2008/0078590 A1 | * | 4/2008 | Sequine | 178/18.06 |
| 2008/0111714 A1 | * | 5/2008 | Kremin | 341/33 |
| 2008/0179112 A1 | * | 7/2008 | Qin et al. | 178/18.06 |

FOREIGN PATENT DOCUMENTS

GB   PCT GB05/000604   *   2/2005

OTHER PUBLICATIONS

USPTO Non-Final Rejection for U.S. Appl. No. 11/442,212 dated Feb. 25, 2011; 13 pages.

* cited by examiner

*Primary Examiner* — Prabodh M Dharia

(57) ABSTRACT

Apparatus and methods for offsetting the reference voltage range of a relaxation-type oscillator decreases sensing time and reduces noise-induced jitter.

14 Claims, 13 Drawing Sheets

-- PRIOR ART --

-- PRIOR ART --

-- PRIOR ART --

-- PRIOR ART --

-- PRIOR ART --

-- PRIOR ART --

-- PRIOR ART --

| V2 | V2' | SW1 |
|---|---|---|
| 0 | 0 | Closed |
| 1 | 0 | Open |
| 1 | 1 | Open |
| 0 | 1 | Open |

| V2' | V1 | SW2 |
|---|---|---|
| 0 | 0 | Open |
| 1 | 0 | Closed |
| 1 | 1 | Open |
| 1 | 0 | Open |

| V2 | V2' | SW3 |
|---|---|---|
| 0 | 0 | Closed |
| 1 | 0 | Open |
| 1 | 1 | Closed |
| 0 | 1 | Open |

REFERENCE VOLTAGE OFFSET FOR CAPACITIVE TOUCH-SENSOR MEASUREMENT

TECHNICAL FIELD

Embodiments of the invention relate to the field of user interface devices and, in particular, to capacitive touch-sensor devices.

BACKGROUND

Computing devices, such as notebook computers, personal data assistants (PDAs), mobile handsets and the like, all have user interface devices. One class of user interface device that has become more common is based on capacitive touch-sensor technology utilizing touch-sensitive capacitors. Touch-sensitive capacitors may be used to implement touch-sensor pads, such as the familiar mouse pad in notebook computers, non-mechanical slider controls (e.g., a volume control) and non-mechanical push-button controls.

FIG. 1A illustrates a typical touch-sensor pad 100. The touch-sensor pad 100 includes a sensing surface 101 on which a conductive object may be used to position a cursor in the x- and y-axes, or to select an item on a display. Touch-sensor pad 100 may also include two buttons, left and right buttons 102 and 103, respectively, which may operate as touch-sensitive switches.

FIG. 1B illustrates a conventional linear touch-sensor slider ("slider") that might be used as a linear control such as a volume control, for example. The slider 110 includes a number of conductive sensor elements 111 separated by insulating gaps 112, where each sensor element is an electrode of a capacitor. Typically, a dielectric material (not shown) is overlaid on top of the sensor elements to prevent any direct electrical conduction between the sensor elements and/or a conductive object when the conductive object is placed on the slider. When a conductive object contacts or comes in proximity to one of the sensor elements, a capacitance associated with the sensor element (or with an adjacent pair of sensor elements) is changed. The change in capacitance can be detected and sent as a signal to a processing device. As a finger or other conductive object moves across the slider, the changing capacitance of each sensor element is detected to pinpoint the location and motion of the conductive object. This same principle (i.e., detecting capacitance changes) can also be used to implement touch sensor buttons (e.g., on-off controls).

FIG. 2A illustrates one form of a touch sensitive capacitor 300. In its basic form, the touch sensitive capacitor 300 includes a pair of adjacent plates 301 and 302. There is a small edge-to-edge (fringing) capacitance $C_f$ between the plates. When a conductive object 303 (e.g., a finger) is placed in proximity to the two plates 301 and 302, there is a capacitance between the conductive object and each of the plates. If the capacitance between the conductive object and each plate is defined as $2*C_S$, then the total capacitance between the plates due to the presence of the conductive object is $C_S$ (the series combination of the two separate capacitances). This capacitance adds in parallel to the fringing capacitance $C_f$ between the plates 301 and 302, resulting in a change in total capacitance equal to $C_S$.

FIG. 2B illustrates another form of a touch sensitive capacitor 307 where two parallel plates 305 are separated by a dielectric layer 308 and one of the plates is grounded. Typically, the ungrounded plate is covered by a second dielectric layer 304. The parallel plate capacitance between the two plates 305 is denoted by Cpp. When the conductive object 303 approaches or contacts dielectric layer 304, a capacitance $C_S$ is created between the conductive object and the ungrounded plate. As a result, the total capacitance from the ungrounded plate to ground is given by the sum of the capacitances Cpp+Cs (the conductive object need not be actually grounded for the touch sensitive capacitor to operate; a human finger, for example, is connected to a person's body capacitance, which can act as a virtual ground). Detecting a touch is then a matter of measuring the change in capacitance from Cpp to (Cpp+Cs). In a typical touch sensitive capacitor, Cs may range from approximately 10 to 30 picofarads (pF), although other ranges may be used. While the conductive object illustrated here is a finger, any conductive object may be used (e.g., a stylus).

A variety of different circuits have been developed that can be used to detect and/or measure the capacitance and/or capacitance changes of touch sensitive capacitors. One type of detection circuit, known as a relaxation oscillator, uses the varying capacitance of the touch sensitive capacitor to control the frequency of oscillation of the relaxation oscillator. When the capacitance of the touch sensitive capacitor changes due to the proximity or contact of a conductive object, a corresponding change in the frequency of the oscillator signals the capacitance change and can be used to locate the position of the conductive object (in the case of a pad or slider, for example) or to trigger the performance of some function related to the touch-sensor. A conventional relaxation oscillator develops a voltage across a touch sensitive capacitor by charging the capacitance of the touch sensitive capacitor with a current source, from ground potential to a threshold voltage, and when the voltage reaches the threshold voltage, the touch sensitive capacitance is discharged to ground and the charging process begins anew. The time required for the voltage to increase from the ground potential to the threshold voltage is the period (reciprocal of frequency) of the oscillator and provides an indirect measure of the capacitance. If the capacitance changes (e.g., due to the proximity of a conductive object), the period (and frequency) of the oscillator changes.

FIG. 3A illustrates a conventional capacitance sensing relaxation oscillator 350. In FIG. 3A, a current source 355 drives a constant current I through a sense capacitor 351. The constant current I charges the capacitor and causes the capacitor voltage $V_C$ to increase linearly. When $V_C$ exceeds a threshold voltage $V_{TH}$, the output 353 ($V_{OUT}$) of comparator 352 goes high and closes switch 354 to discharge the sense capacitor 351 to ground. The output 353 of the comparator 352 goes low, opening switch 354, and the cycle starts over.

One disadvantage of conventional relaxation oscillators, or any oscillator that discharges a frequency control element (such as a capacitor) to ground, is that the ground reference is generally noisy (in an electrical sense), especially in digital signal environments. Ground noise causes uncertainty in the starting voltage of the touch sensitive capacitor after discharge, which results in uncertainty (i.e., jitter) in the period of oscillation. As a result, the precision of the capacitance sensing/measurement is impaired. If the noise is not random (as in the case of digital noise, for example), the uncertainty cannot be removed by averaging.

This effect is shown in FIG. 3B, which illustrates the capacitor voltage $V_C$ versus time in the circuit of FIG. 3A. In FIG. 3B, the solid waveform 356 represents an ideal relaxation oscillator waveform that would be produced by a noiseless ground. Box 357 represents the range of uncertainty in the ground potential due to noise. This uncertainty is translated to uncertainty in the timing of waveform 356, represented by the dotted waveforms 358 and 359, which are shown bracketing the ideal waveform 356, which has a nominal period of oscillation T (the uncertainty applies to every period, even though not shown in FIG. 3B). FIG. 3C illustrates how the uncertainty in the timing of $V_C$ affects the output 353 ($V_{OUT}$) of the relaxation oscillator 350. In FIG. 3C, the solid waveform 360 represents an ideal output waveform that would be produced in the absence of ground noise, while the dotted waveforms 361 and 362 illustrate the range of jitter in the output introduced by the ground noise 357. The actual frequency of oscillation of the relaxation oscillator will then jitter around the nominal frequency $f_{OSC}$ from period to period.

BRIEF DESCRIPTION OF THE DRAWINGS

The present invention is illustrated by way of example, and not by way of limitation, in the figures of the accompanying drawings.

DETAILED DESCRIPTION

Figure 1A:
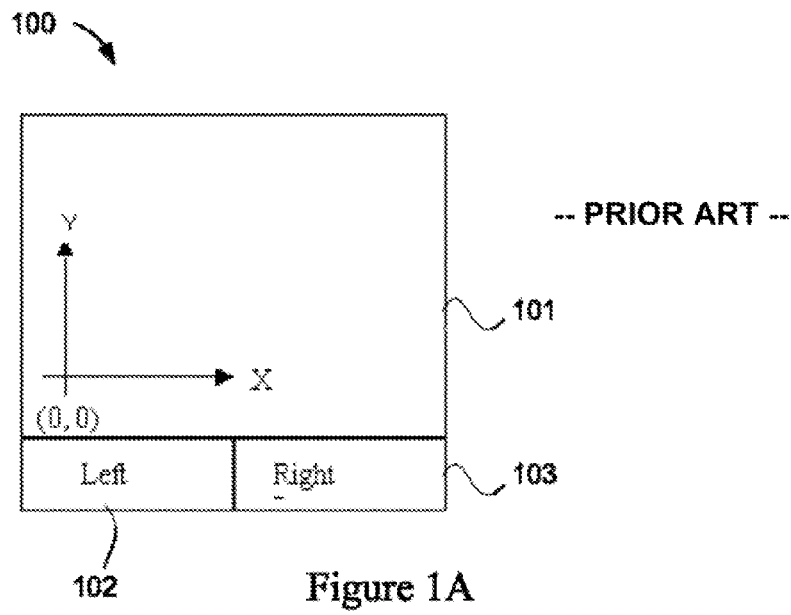
FIG. 1A illustrates a conventional touch-sensor pad.
Figure 1B:
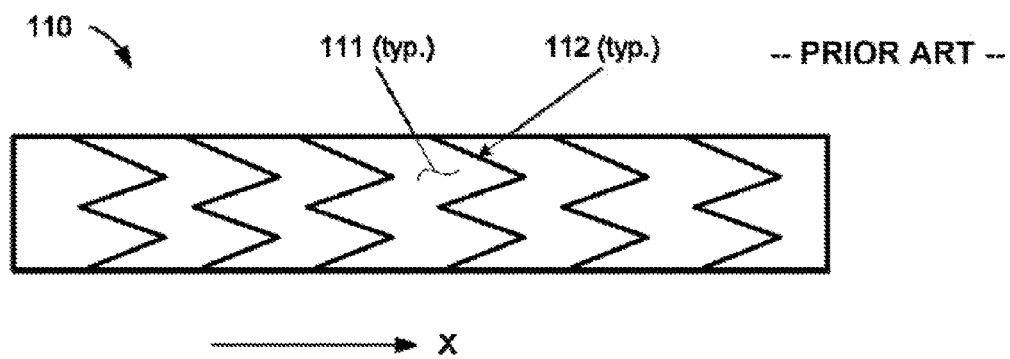
FIG. 1B illustrates a conventional linear touch-sensor slider.
Figure 2A:
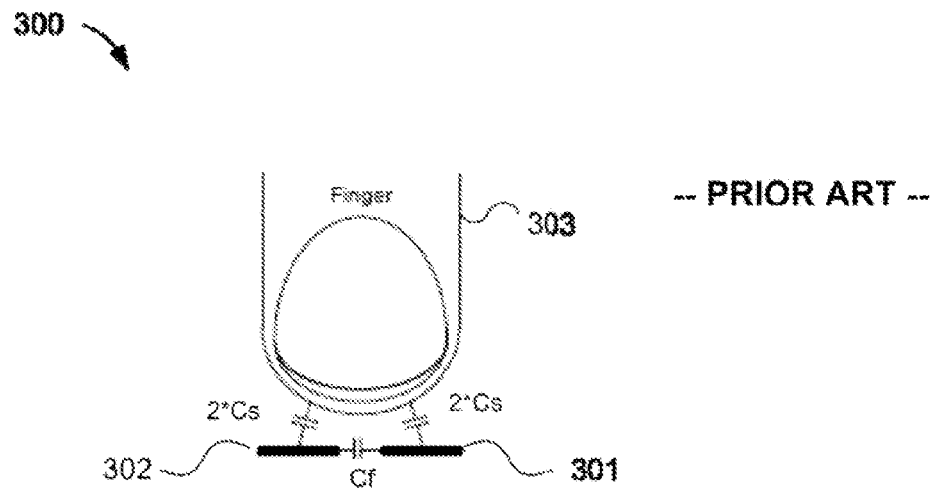
FIG. 2A illustrates one form of a touch-sensitive capacitor.
Figure 2B:
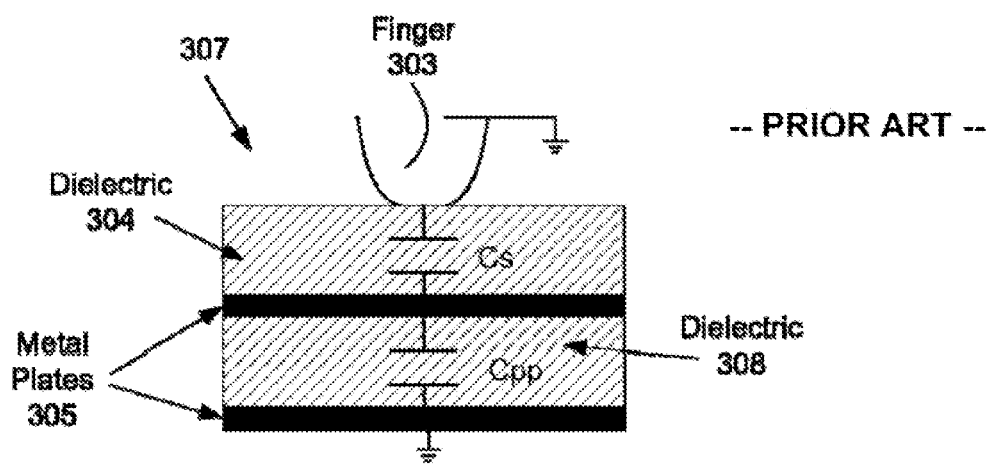
FIG. 2B illustrates another form of a touch-sensitive capacitor.
Figure 3A:
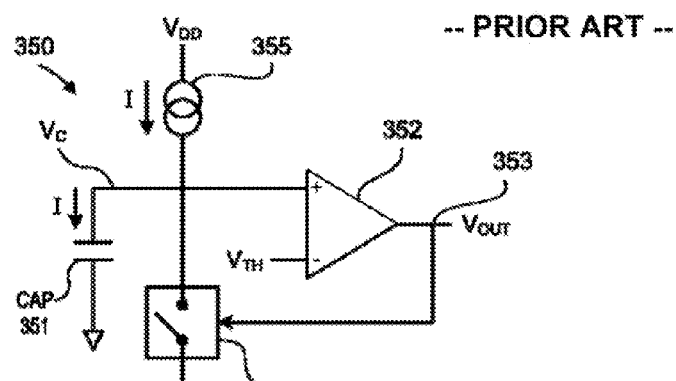
FIGS. 3A-3C illustrate a conventional relaxation oscillator.
Figure 3B:
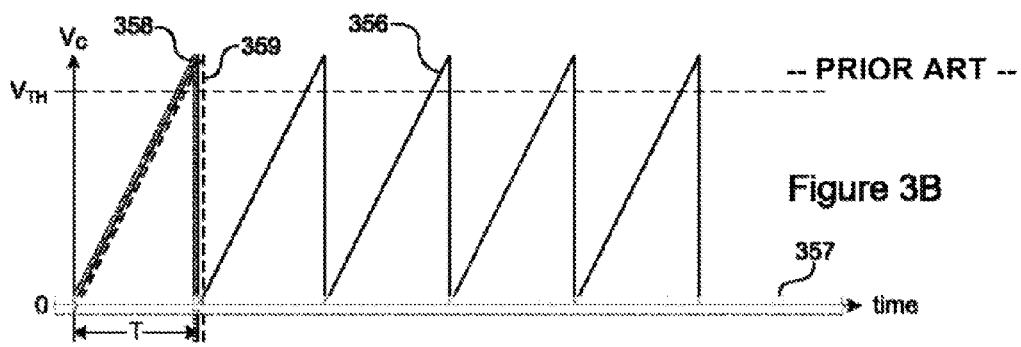
Figure 3C:
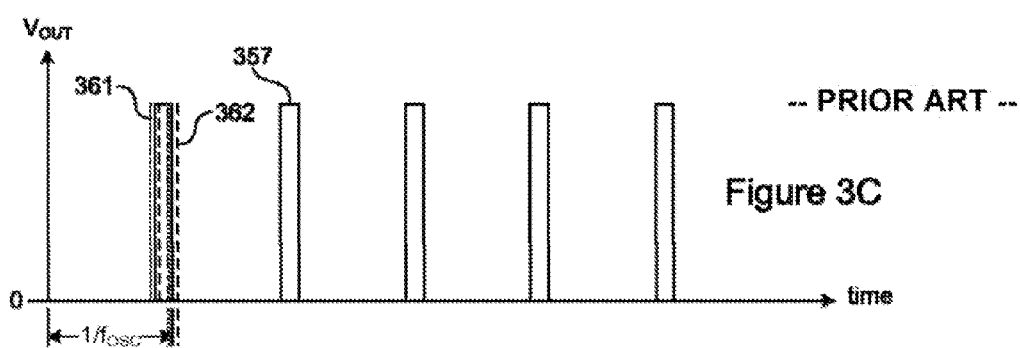

Described herein are methods and apparatus for determining the capacitance of a capacitive touch-sensor, including means for decreasing the sensing time for a capacitance sensor while moving a measurable part of a capacitance charge ramp of the capacitance sensor away from a ground potential, and means for timing the measurable part of the capacitance charge ramp.

The following description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

In the following description, the term "capacitive touch sensor" is used to denote any device, assembly and/or component that exhibits a change in capacitance due to the contact or proximity of a conductive or dielectric object and includes, but is not limited to, touch sensitive pads, touch sensitive sliders and touch sensitive buttons. As used herein, the term "touch sensitive capacitor" denotes a single capacitive element that may be a component of a capacitive touch sensor such as a touch sensitive pad and/or a touch sensitive slider, or that may function as a touch sensitive switch and/or non-mechanical pushbutton. The term "capacitance sensor," as used herein, includes but is not limited to, any component, system or subsystem that is capable of detecting and/or measuring capacitance and/or changes in capacitance (such as the change in capacitance of a touch sensitive capacitor, for example).

In one embodiment, a method for determining the capacitance of a touch sensitive capacitor includes stepping the sense voltage of a relaxation oscillator to a first reference voltage, ramping the sense voltage of the relaxation oscillator between the first reference voltage and a second reference voltage above the first reference voltage, and then stepping the sense voltage to a voltage below the first reference voltage.

In one embodiment, an apparatus for determining the capacitance of a capacitive touch-sensor includes a touch-sensitive capacitor and a relaxation oscillator selectively coupled to the touch-sensitive capacitor, where the relaxation oscillator is configured to step-charge the touch-sensitive capacitor to a first reference voltage, to ramp-charge the touch-sensitive capacitor to a second reference voltage above the first reference voltage, and to step-discharge the touch-sensitive capacitor to a voltage below the first reference voltage.

FIGS. 4A through 4G illustrate the structure and operation of a relaxation oscillator 400 in one embodiment. Relaxation oscillator 400 is coupled to a touch sensitive capacitor 401 with a variable capacitance $C_T$. Relaxation oscillator 400 includes a switched voltage source $V_{REF1}$ coupled to capacitor 401 through switch SW1. In one embodiment, voltage source $V_{REF1}$ may be a bandgap voltage source as is known in the art. Relaxation oscillator 400 also includes a switched current source 402 coupled to capacitor 401 through switch SW2. Relaxation oscillator 400 also includes a ground switch SW3 coupled to capacitor 401. Switches SW1, SW2 and SW3 are controlled by voltages from comparators A1 and A2, which sense the voltage $V_C$ on capacitor 401 and compare $V_C$ with reference voltages $V_{REF1}$ and $V_{REF2}$ as described below. Both $V_{REF1}$ and $V_{REF2}$ may be supplied by bandgap voltage sources. Relaxation oscillator 400 also includes delay elements (Δ) 403 and 404, which are used to delay the logical output voltages V1 and V2 of comparators A1 and A2, respectively, and to control the timing of switches SW1, SW2 and SW3. Delay elements 403 and 404 may be, for example, shift registers that are clocked by a system clock signal (not shown). In the embodiment illustrated in FIGS. 4A-4G, switch SW1 is controlled by V2 and a delayed version of V2 (V2'), switch SW2 is controlled by V1 and V2' and switch SW3 is controlled by V2 and a delayed version of V1 (V1'). Switches SW1, SW2 and SW3 may be any type of solid-state switch, such as diode switches or transistor switches, for example. Switches SW1, SW2 and SW3 may include control circuitry (not shown) known in the art to operate switches SW1, SW2 and SW3 as simple state machines where the state of the switch depends on the previous state of the switch and the present control inputs. Certain embodiments may include more than one delay element per comparator, or delay elements with more than one clock cycle delay, to control the timing of switches SW1, SW2 and SW3.

Figure 4A:
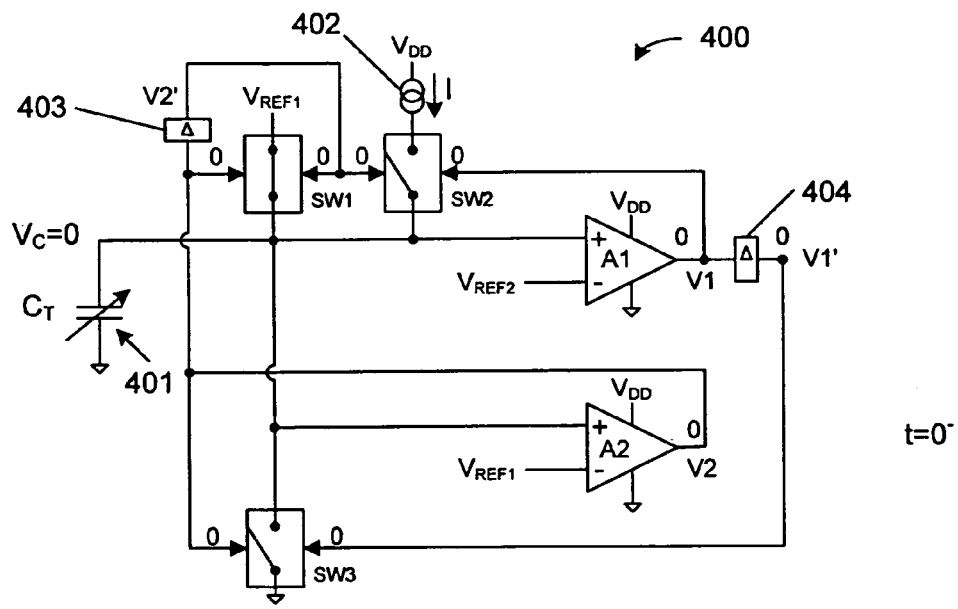
FIGS. 4A-4G illustrate reference voltage offset for capacitive touch-sensor measurement in one embodiment.
Figure 4B:
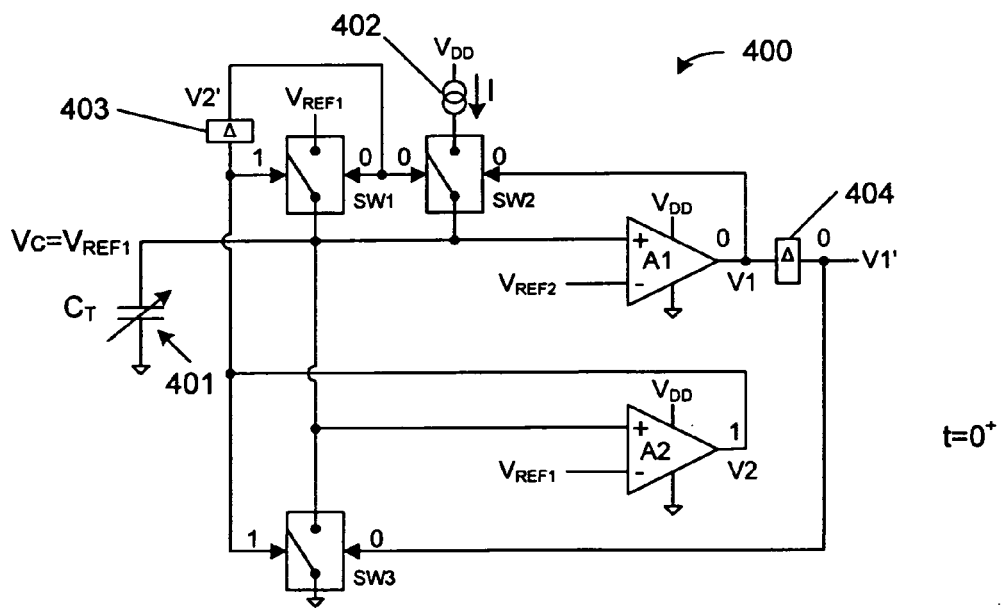
Figure 4C:
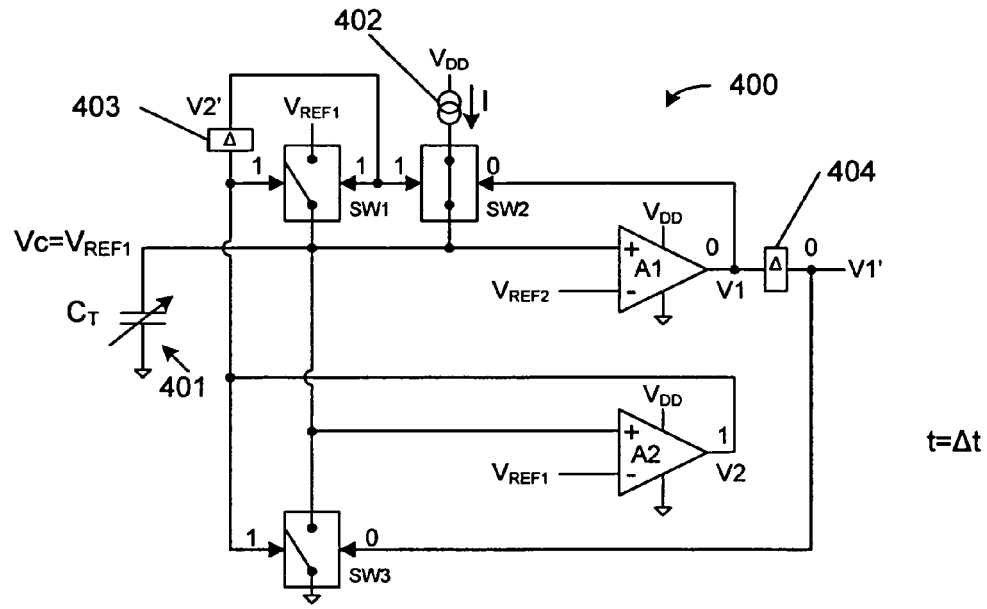
Figure 4D:
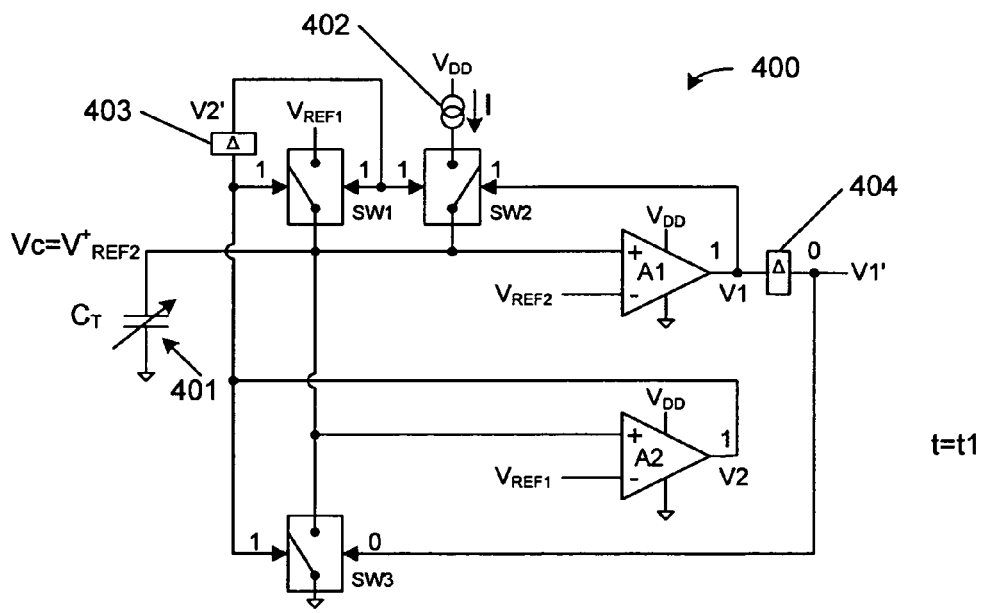
Figure 4E:
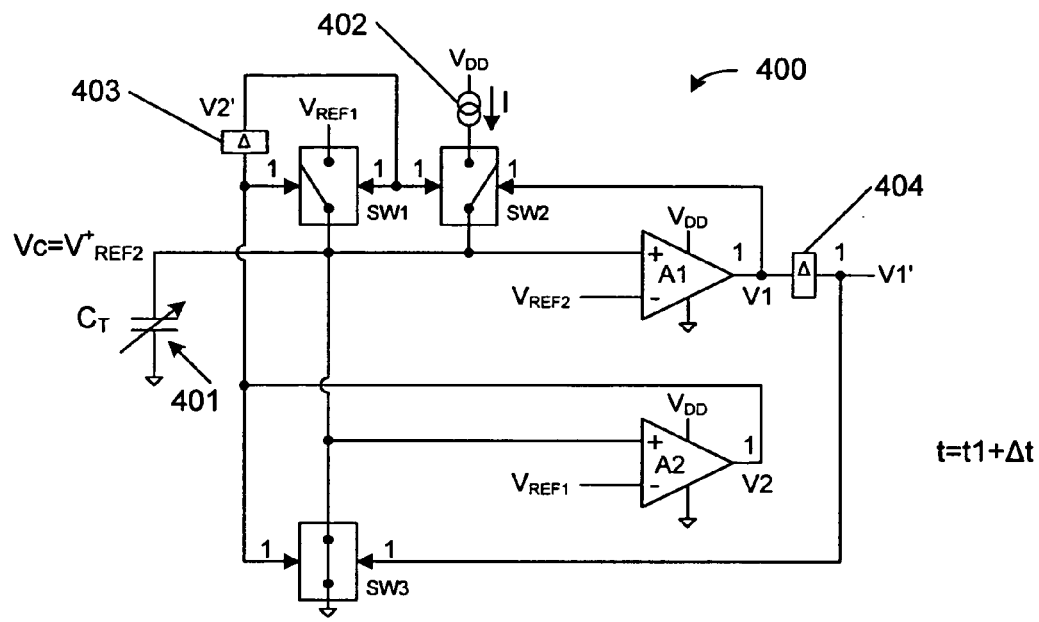
Figure 4F:
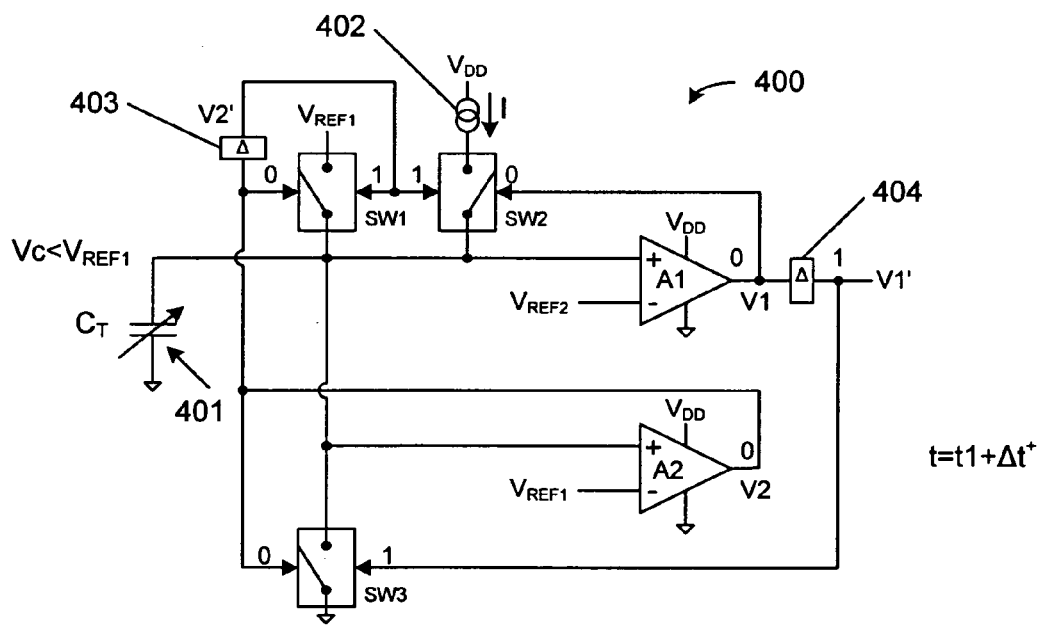
Figures 4G, 5A, 5B, 5C:
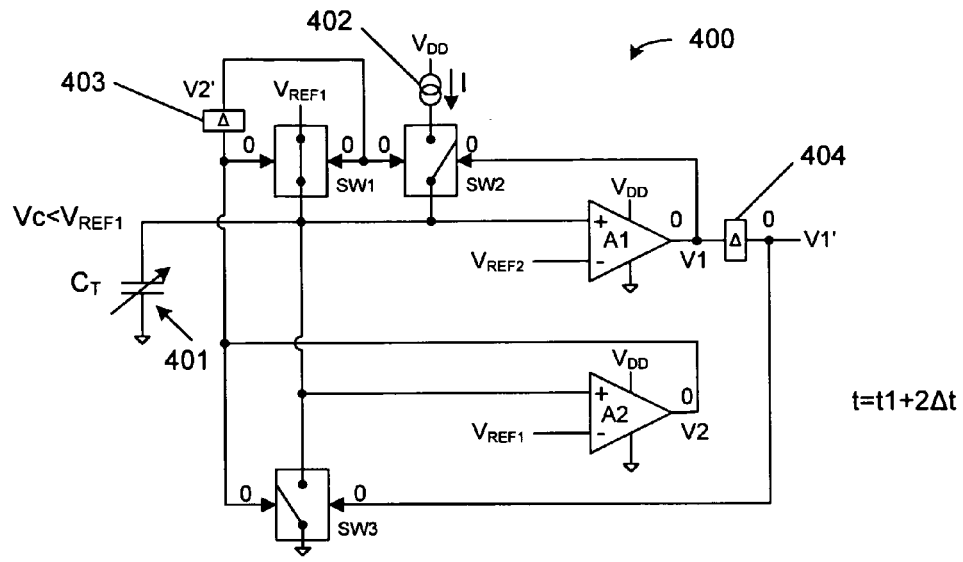
FIGS. 5A-5C illustrate state tables for the embodiment of FIGS. 4A-4G.

FIG. 4A illustrates an initial quiescent state at t=0⁻, just before power is applied, where the power supply voltage $V_{DD}$, the reference voltages $V_{REF1}$ and $V_{REF2}$ are zero and the outputs of A1 and A2 and their associated delay elements 404 and 403 are also zero. The initial states of switches SW1, SW2 and SW3 are also illustrated (state tables for switches SW1, SW2 and SW3 are shown in FIGS. 5A-5C). Switch SW1 is initially closed and switches SW2 and SW3 are initially open.

At t=0, power is applied and capacitor 401 is almost instantaneously step-charged to $V_{REF1}$ (the charge rate is limited only by the internal impedance of the source of $V_{REF1}$ and the residual resistance of SW1 and the circuit traces connecting SW1 to capacitor 401). At t=0⁺, as illustrated in FIG. 4B, capacitor 401 has been charged to $V_{REF1}$ and the output V2 of comparator A2 has transitioned to a logical one, opening switch SW1. One clock cycle later, at t=Δt, as illustrated in FIG. 4C, the output V2' of delay element 403 transitions to a logical one and closes switch SW2, allowing current source 402 to charge capacitor 401. The voltage on capacitor 401 is given by:

$$V_C = V_{REF1} + \frac{I}{C_T} \int_{\Delta t}^{t} dt$$

which is a linear ramp increasing from $V_{REF1}$ with a slope of $I/C_T$. At some time t=t₁, as illustrated in FIG. 4D, the voltage on capacitor 401 exceeds $V_{REF2}$ (where $V_{REF2} > V_{REF1}$) and the output of comparator A1 transitions to a logical one, opening switch SW2 and interrupting the charging of capacitor 401. One clock cycle later at t=t₁+Δt, as illustrated in FIG. 4E, the output of delay element 404 transitions to a logical 1, closing switch SW3 and almost instantaneously discharging capacitor 401 to a voltage below $V_{REF1}$. At t=t₁+Δt⁺, as illustrated in FIG. 4F, the outputs of comparators A1 and A2 transition to logical zero and switch SW3 is opened. One clock cycle later, at t=t₁+2Δt as illustrated in FIG. 4G, the outputs of delay elements 403 and 404 transition to logical zero, switch SW1 is closed, and the circuit is returned to its initial state where the cycle is repeated.

Figure 6E:
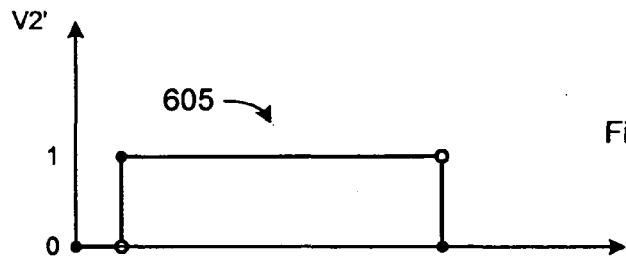
FIGS. 6A-6H illustrate waveforms corresponding to the embodiment of FIGS. 4A-4G.
Figure 6D:
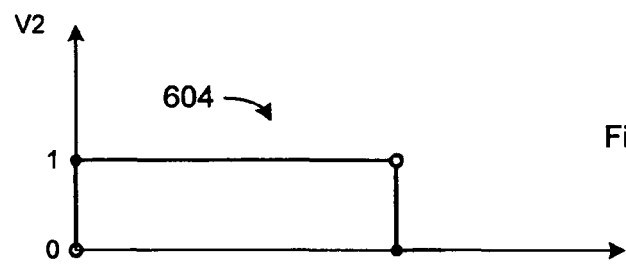
Figure 6C:
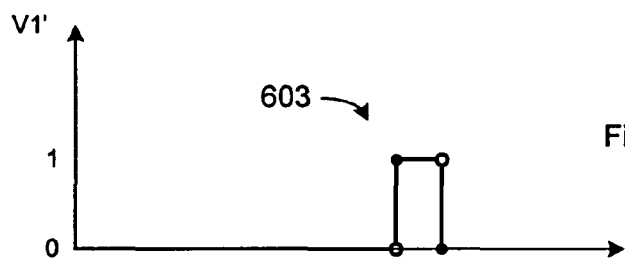
Figure 6B:
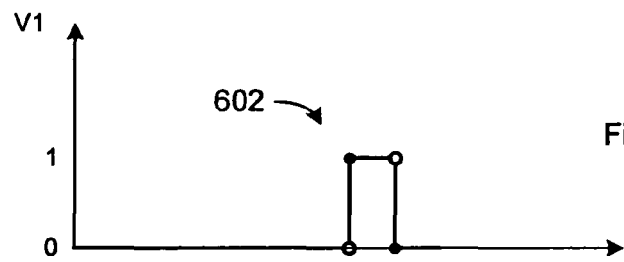
Figure 6A:
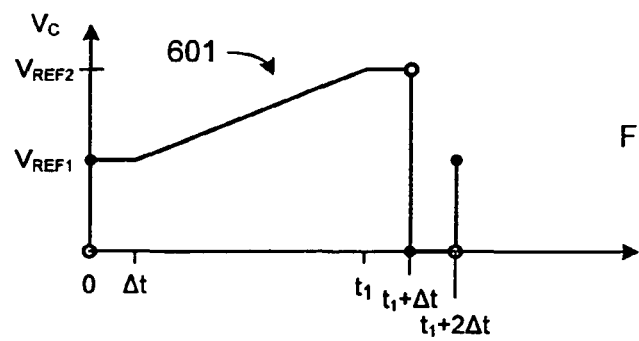
Figure 6F:
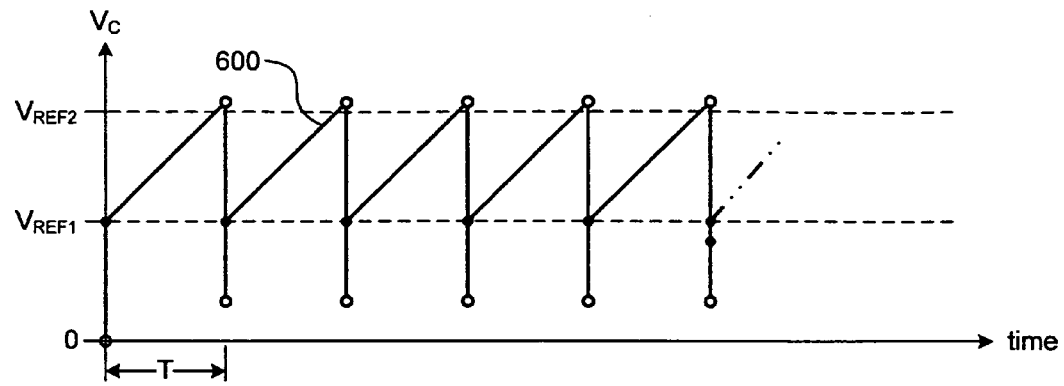
Figure 6G:
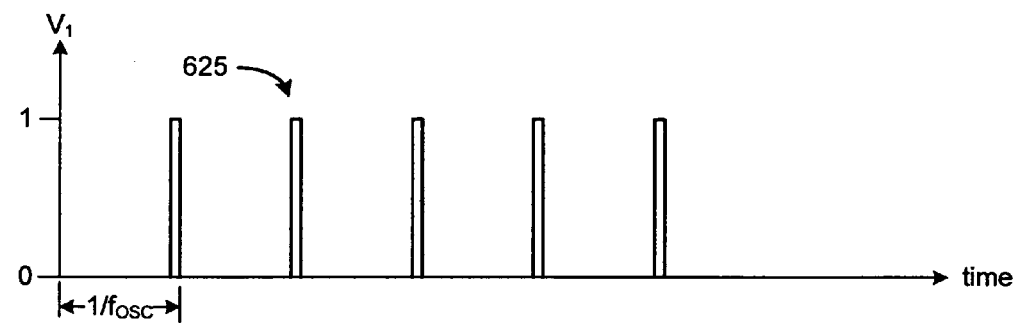
Figure 6H:
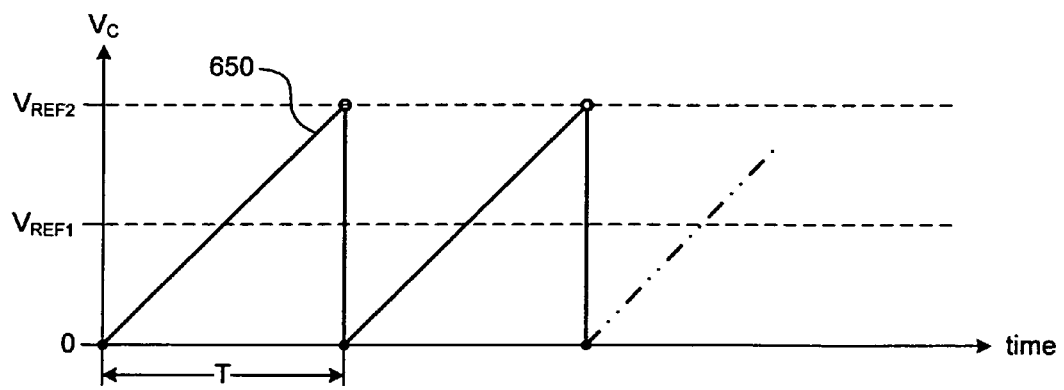

FIGS. 6A through 6E illustrate, respectively, the voltage on capacitor 401 ($V_C$), the output of comparator A1 (V1), the output of delay element 404 (V1'), the output of comparator A2 (V2) and the output of delay element 403 (V2'). Note that in FIGS. 6A-6E, finite signal transition times are indicated by vertical line segments with the well-known open and closed circle notation. Note also that the Δt time intervals, indicating a single clock cycle, are highly exaggerated for visibility. In practice, and as described in greater detail below, a single clock cycle will normally represent only a small fraction of the period of oscillation of relaxation oscillator 400. This is illustrated in FIG. 6F, which illustrates multiple periods of oscillation of relaxation oscillator 400. FIG. 6G illustrates the output waveform 625 of output V1 of comparator A1, where the time period between pulses is the reciprocal of the frequency of oscillation $f_{OSC}$. If Δt<<t₁, as noted above, then the period of oscillation T of relaxation oscillator 400 is approximately equal to t1, and the frequency of oscillation is given by:

$$f_{OSC} = \frac{1}{T} = \frac{I}{C_T} \left( \frac{1}{V_{REF2} - V_{REF1}} \right)$$

For a given value of $V_{REF2}$, $C_T$ and I, it can be seen that step-charging capacitor 401 to $V_{REF1}$ reduces the period of oscillation (i.e., increases the oscillation frequency) compared to the case where the capacitor voltage is ramped from zero to $V_{REF1}$ and then to $V_{REF2}$, as illustrated by waveform 650 in FIG. 6G.

Figure 10:
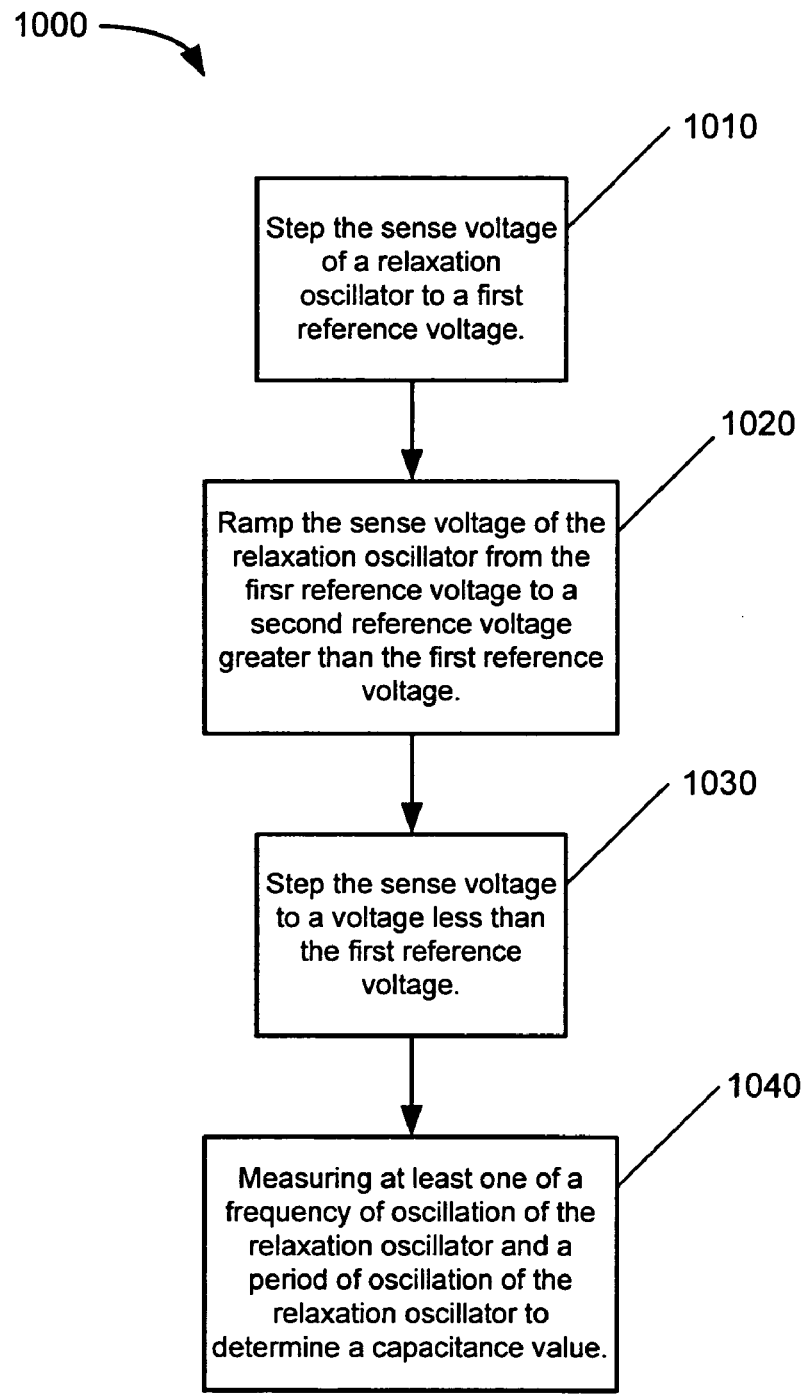
FIG. 10 is a flowchart illustrating a method of reference voltage offset for capacitive touch-sensor measurement in one embodiment.

FIG. 10 is a flowchart illustrating a method 1000 according to one embodiment. With reference to FIGS. 4A-4G and FIG. 8, the method begins by stepping the sense voltage ($V_C$) of a relaxation oscillator (400) to a first reference voltage ($V_{REF1}$) at operation 1010. The method continues by ramping the sense voltage of the relaxation oscillator from the first reference voltage to a second reference voltage ($V_{REF2}$) greater than the first reference voltage at operation 1020. The method continues at operation 1030 by stepping the sense voltage to a voltage less than the first reference voltage. The method concludes at operation 1040 by measuring at least one of a period of oscillation (T) of the relaxation oscillator and a frequency of oscillation ($f_{OSC}$) of the relaxation oscillator to determine the capacitance ($C_T$) of a touch sensitive capacitor (401).

Figure 7:
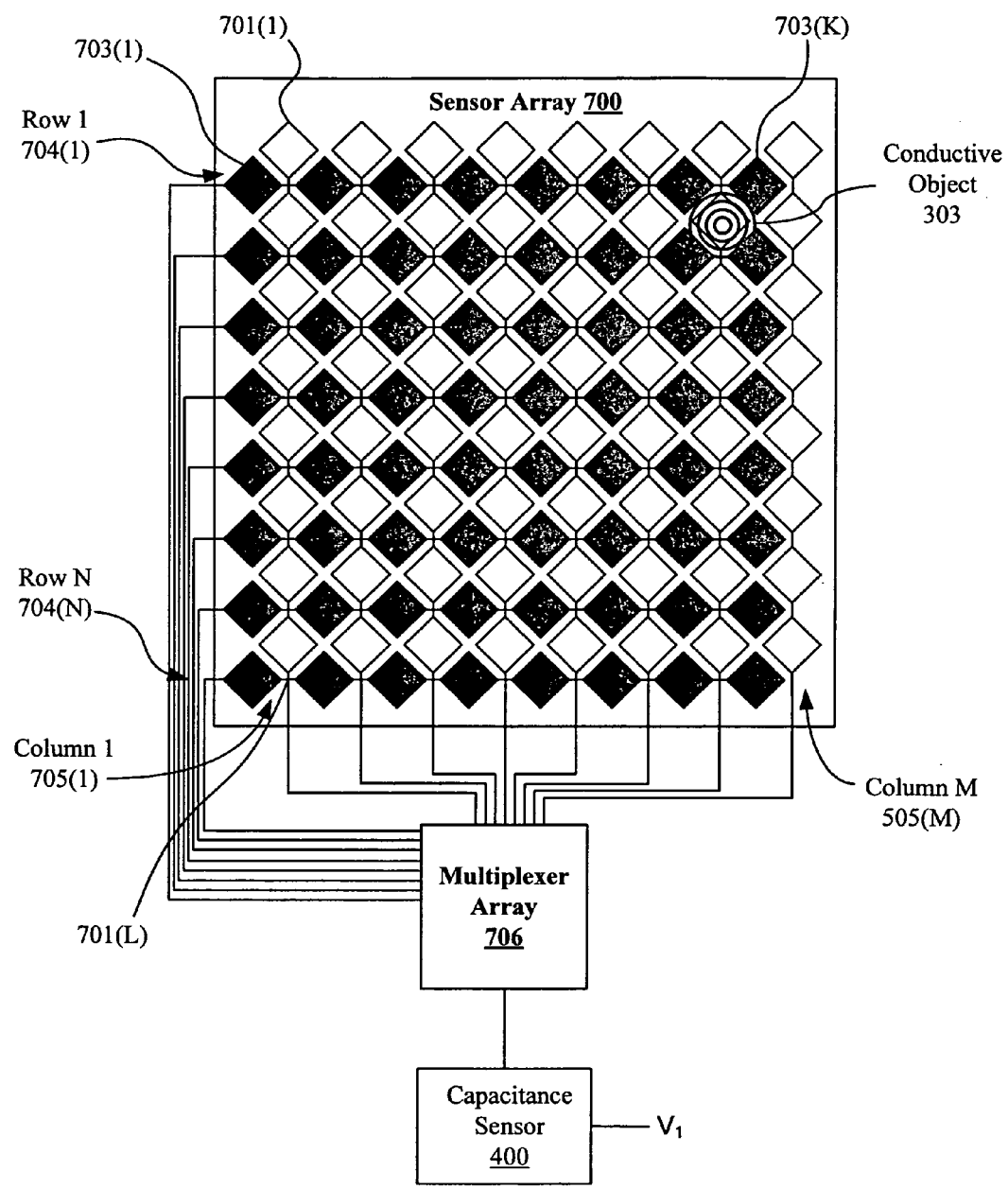
FIG. 7 illustrates a touch-sensitive component that may be combined with certain embodiments of the present invention.

As noted above, a touch sensitive capacitor may be part of a touch sensitive component such as a slider control and/or a touchpad, which may contain multiple touch sensitive capacitors. A relaxation oscillator, such as relaxation oscillator 400, may be configured to interface with a multiple touch sensitive capacitors by multiplexing connections between the relaxation oscillator and the multiple capacitor component. One example is illustrated in FIG. 7 for the case of a sensor array 700 that might be used in a touchpad. Sensor array 700 includes N rows of touch sensitive capacitors 704(1)-704(N), where each row includes K interconnected touch sensitive capacitors 701(1)-701(K), and M columns of touch sensitive capacitors 705(1)-705(M), where each column includes L interconnected touch sensitive capacitors 701(1)-701(L).

Each row and each column may be connected to a multiplexer array 706, which may be configured to selectively and/or sequentially connect each row and column, in turn, to relaxation oscillator 400 (multiplexers are known in the art and, accordingly, are not described in detail). When there is no conductive object in proximity to the sensor array, relaxation oscillator 400 will output a baseline signal V1 for each row and column of the array with a frequency of oscillation corresponding to an intrinsic capacitance of the respective row or column. When a conductive object 303 contacts the sensor array, the capacitance of at least one row and one column will be increased, and the frequency of oscillation associated with that row or column will be decreased. The change in frequency may be detected, as described in greater detail below, to identify the row and column and locate the conductive object. It will be appreciated that the same or similar principles may be used to locate a conductive object along a one dimensional array as might be used in a slider control, for example.

Figure 8:
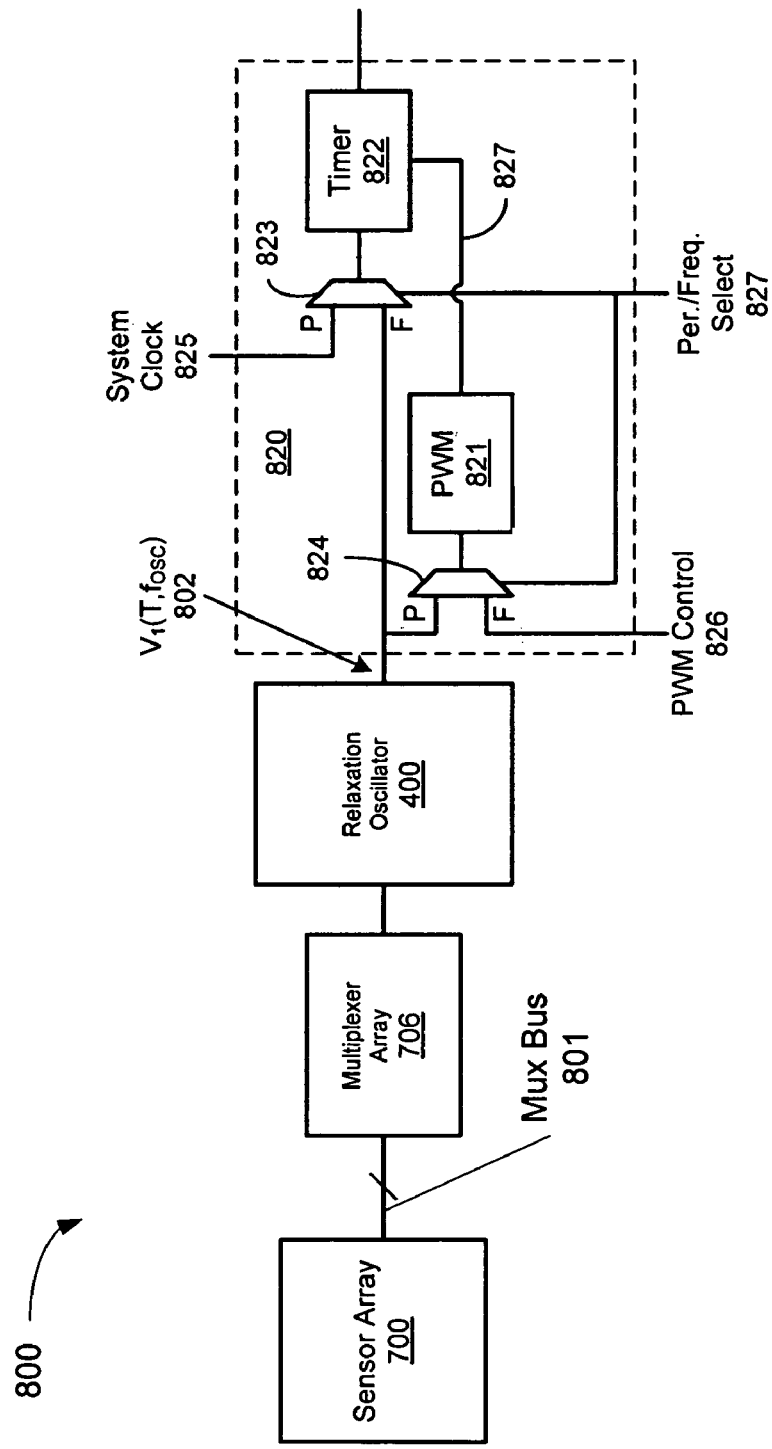
FIG. 8 is a block diagram illustrating a system for determining the period and/or frequency of the output of a relaxation oscillator in one embodiment.

FIG. 8 is a block diagram illustrating a system 800 in one embodiment for measuring the frequency and/or period of oscillation of a relaxation-type relaxation oscillator, such as relaxation oscillator 400 described above. System 800 includes a sensor array, such as sensor array 700 described above, coupled via a mux bus 801 to a multiplexer array such as multiplexer array 706 described above, a relaxation oscillator 400 coupled with the multiplexer array and a digital counter 820. Digital counter 820 is coupled to the output 802 (V1) of relaxation oscillator 400 and may be configured to measure the period of oscillation and/or the frequency of oscillation of output 802.

As previously described with respect to the relaxation oscillator 350, when a finger or conductive object is placed on the sensor array 700, the capacitance increases from Cf to Cf+Cs (or from Cpp to Cpp+Cs, depending on the configuration of the touch-sensitive capacitors in the sensor array) so the frequency of output 802 ($f_{OSC}$) decreases and the period of output 802 (T) increases. The output 802 is fed to the digital counter 820 for measurement. There are two methods for counting the relaxation oscillator output signal 802: frequency measurement and period measurement. In one embodiment, the digital counter 820 may include two multiplexers 823 and 824. Multiplexers 823 and 824 are configured to select the inputs for the pulse width modulator (PWM) 821 and the timer 822 for the two measurement methods, under the control of a period/frequency select signal 827. Alternatively, other selection circuits may be used to select the inputs for the PWM 821 and the timer 822. In another embodiment, multiplexers 823 and 824 are not included in the digital counter, for example, the digital counter 820 may be configured in one, or the other, measurement configuration only.

In the frequency measurement method, timer 822 is connected to output 802 and PWM 821 is connected to a control signal 826. The frequency of control signal 826 controls the width of a pulse at the output 827 of PWM 821 which is used to gate timer 822. The relaxation oscillator output signal 802 is counted by timer 822 during the gate time. The counter 822 is then read to obtain the number of counts during the gate time. Control signal 826 may be derived from the system clock 825, for example, by dividing the system clock signal 825, so that the duration of the gating pulse is known. The frequency of the output 802 of the relaxation oscillator 400 may then be calculated by dividing the count from timer 822 by the duration of the gating pulse.

In the period measurement method, the output 802 of relaxation oscillator 400 is connected to PWM 821 and the timer 822 is connected to system clock signal 825. The output 827 of PWM 821 is a pulse having a width equal to the period of oscillation of relaxation oscillator output 802. This pulse gates timer 822, which counts the system clock signal 825 over the duration of the gating pulse. The frequency (and period) of the system clock 825 is known, so that the period of the relaxation oscillator output can be calculated from the number of system clock cycles (periods) counted by timer 822 during the time that timer 822 is gated by the output of PWM 821.

The two counting methods may have equivalent performance in sensitivity and signal-to-noise ratio (SNR). The period measurement method may have a slightly faster data acquisition rate, but this rate is dependent on software loads and the values of the touch-sensitive capacitors in the sensor array 700. The frequency measurement method has a fixed data acquisition rate.

At startup, the touch-sensitive capacitors in sensor array 700 are scanned by multiplexer array 706 and the count values for each capacitor is stored as an array of baseline counts (n). The presence of a conductive object on the array is determined by the difference in counts (Δn)) between a stored value for a capacitor in the array and a subsequent count value during a subsequent scan. The ration of the acquired value with switch actuation, referred to here as Δn. The ration of Δn to n equals the ratio to Cs to Cpp. That is:

$$\frac{\Delta n}{n} = \frac{Cs}{Cpp} \qquad (4)$$

Figure 9:
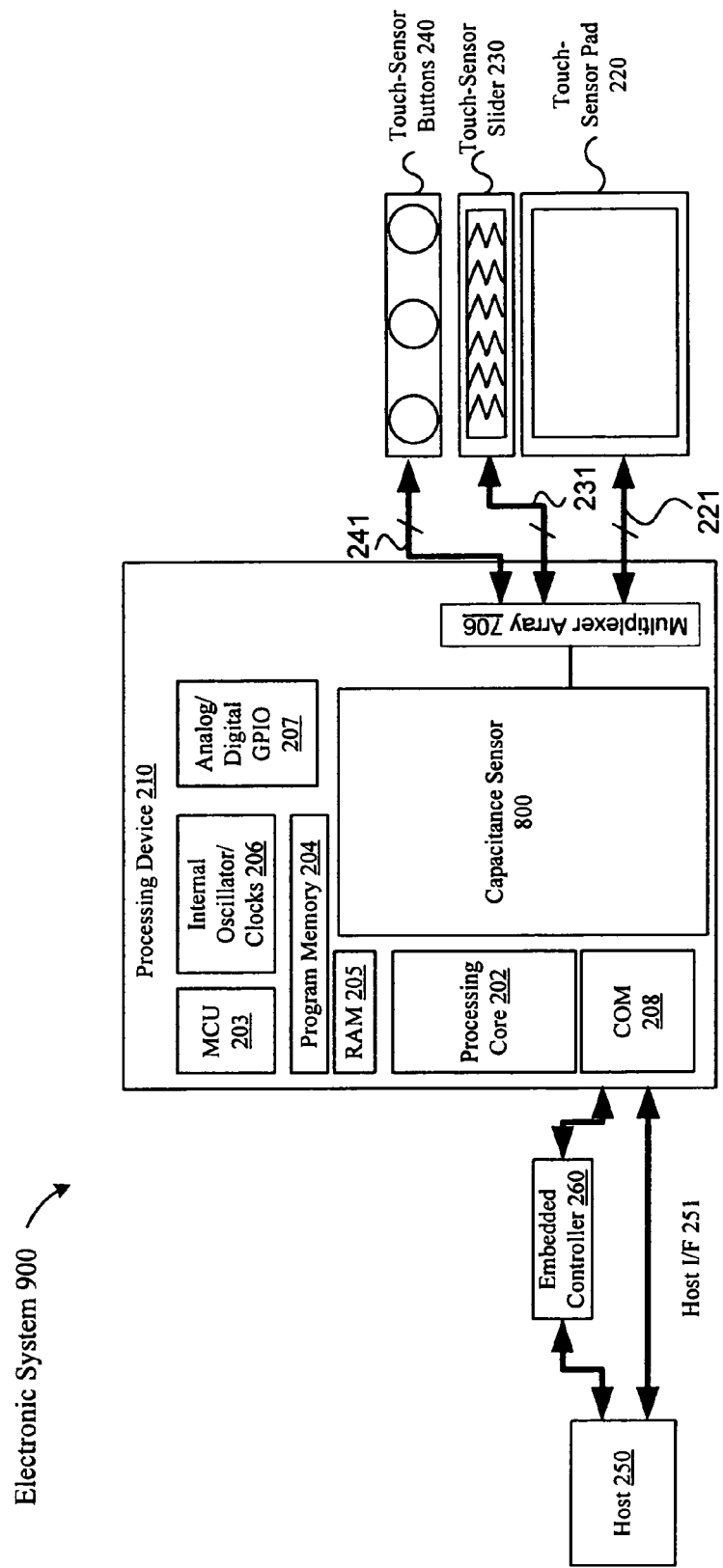
FIG. 9 is a block diagram of an electronic system in which embodiments of the present invention may be implemented.

FIG. 9 illustrates a block diagram of one embodiment of an electronic system 900 in which embodiments of the present invention may be implemented. Electronic system 900 includes processing device 210 and may include touch-sensor pad 220, touch-sensor slider 230, touch-sensor buttons 240, host processor 250 and embedded controller 260. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus (not illustrated). Processing device 210 may also include memory, such as random access memory (RAM) 205 and program memory 204. RAM 205 may be static RAM (SRAM), dynamic RAM (DRAM) or any other type of random access memory. Program memory 204 may be any type of non-volatile storage, such as flash memory for example, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. The analog block array also may be configured to implement a variety of analog circuits (e.g., ADC, analog filters, etc.) using, in one embodiment, configurable UMs. The analog block array may also be coupled to the GPIO 207.

As illustrated in FIG. 9, processing device 210 includes capacitance sensor 800, as described above. In certain embodiments, capacitance sensor 800 may include analog I/O for coupling to an external component, such as touch-sensor pad 220, touch-sensor slider 230, touch-sensor buttons 240, and/or other devices. Capacitance sensor 800 and processing device 210 are described in more detail below.

It should be noted that the embodiments described herein are not limited to touch-sensor pads for notebook implementations, but can be used in other capacitive sensing implementations. For example, the sensing device may be a touch-sensor slider 230, or a touch-sensor button 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, as noted above, the electronic system 900 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 900 includes a touch-sensor slider 230 coupled to the processing device 210 via bus 231. Touch-sensor slider 230 may include a single-dimension sensor array. The single-dimension sensor array comprises a plurality of sensor elements, organized as rows, or alternatively, as columns. In another embodiment, the electronic system 900 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitive sensor element. Capacitive sensor elements may be used as non-contact switches. These switches, when protected by an insulating layer, offer resistance to severe environments.

The electronic system 900 may include any combination of one or more of the touch-sensor pad 220, touch-sensor slider 230, and/or touch-sensor button 240. In another embodiment, the electronic system 900 may also include non-capacitive sensor elements 270 coupled to the processing device 210 via bus 271. The non-capacitive sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide additional functionality such as keyboard control integration, LEDs, battery charger and general purpose I/O, as illustrated as non-capacitive sensor elements 270. Non-capacitive sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 900 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 800 may be integrated into the IC of the processing device 210, or alternatively, in a separate IC. Alternatively, descriptions of capacitance sensor 800 may be generated and compiled for incorporation into other integrated circuits. For example, behavioral level code describing capacitance sensor 800, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 800.

It should be noted that the components of electronic system 900 may include all the components described above. Alternatively, electronic system 900 may include only some of the components described above.

In one embodiment, electronic system 900 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

Embodiments of the present invention, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   stepping a sense voltage of a relaxation oscillator coupled to a touch sensitive capacitor to a first reference voltage;
   ramping the sense voltage of the relaxation oscillator from the first reference voltage to a second reference voltage greater than the first reference voltage, wherein stepping the sense voltage comprises step-charging a capacitance to a voltage with the first reference voltage at a first time; and stepping the sense voltage to a voltage less than the first reference voltage, wherein ramping the sense voltage comprises charging the capacitance with a current source until the voltage increases to the second reference voltage at a second time by disconnecting the capacitance from the first reference voltage and connecting the capacitance to the current source after the capacitance is disconnected from the first reference voltage.

2. The method of claim 1, wherein stepping the sense voltage comprises step-discharging the capacitance to the voltage less than the first reference voltage at a third time, wherein a time period between the first time and the third time comprises a measurement of the capacitance and wherein a change in the time period between the first time and the third time comprises a change in the capacitance.

3. The method of claim 1, wherein step-charging the capacitance comprises connecting the capacitance to the first reference voltage.

4. The method of claim 2, wherein step-charging the capacitance comprises disconnecting the capacitance from the current source and connecting the capacitance to the voltage below the first reference voltage after the capacitance is disconnected from the current source.

5. The method of claim 1, wherein the first reference voltage comprises a band-gap voltage and the second reference voltage comprises two bad-gap voltages in series.

6. The method of claim 2, further comprising measuring the time period between the first time and the third time.

7. The method of claim 2, further comprising measuring a reciprocal of the time period between the first time and the third time.

8. An apparatus, comprising:
   a touch-sensitive capacitor;
   a relaxation oscillator, selectively coupled to the touch-sensitive capacitor, wherein the relaxation oscillator is configured to step-charge the touch sensitive capacitor to a first reference voltage to ramp-charge the touch-sensitive capacitor to a second reference voltage above the first reference voltage, and to stop-discharge the touch-sensitive capacitor to a voltage below the first reference voltage, and the relaxation oscillator includes:
   a switched voltage source equal to the first reference voltage to step charge the touch-sensitive capacitor to the first reference voltage at a first time,
   a switched current source to ramp-charge the touch sensitive capacitor of the second reference voltage at a second time, and a ground switch to step-discharge the touch sensitive capacitor to the voltage below the first reference voltage at a third time; and a first comparator to compare voltage of the touch-sensitive capacitor to the first reference voltage, wherein the first comparator is configured to:

disconnect the ground switch from the touch-sensitive capacitor and connect the switched voltage source to the touch-sensitive capacitor when the voltage of the touch-sensitive capacitor is below the first reference voltage; and connect the switched current source to the touch-sensitive capacitor, after a first delay, when the voltage of the touch-sensitive capacitor is at or above the first reference voltage.

9. The apparatus of claim 8 wherein a time period from the first time to the third time comprises a period of oscillation of the relaxation oscillator to determine at least one of the period of oscillation of the relaxation oscillator and a frequency of oscillation of the relaxation oscillator.

10. The apparatus of claim 8, wherein the switched voltage source, the first reference voltage and the second reference voltages comprise bad-gap voltage sources.

11. The apparatus of claim 8, further comprising a second comparator to compare the voltage on the touch-sensitive capacitor to the second reference voltage, wherein the second comparator is configured to:

disconnect the switched current source from the touch-sensitive capacitor when the voltage of the touch-sensitive capacitor is at or above the second reference voltage; and connect the ground switch from the touch-sensitive capacitor, after a second delay, when the voltage on the touch-sensitive capacitor is at or above the second reference voltage.

12. An apparatus, comprising:

means for decreasing a sensing time for a capacitance sensor while moving a measurable part of a capacitance charge ramp of the capacitance sensor away from a ground potential, the means for decreasing comprising:

means for stepping a sense voltage of a relaxation oscillator to a first reference voltage above the ground potential;

means for ramping the sense voltage between the first reference voltage and a second reference voltage;

means for stepping the sense voltage to a voltage below the first reference voltage;

means for timing the measurable part of the capacitance charge ramp;

means for step-charging a capacitance to a voltage with the first reference voltage at a first time;

means for charging the capacitance with a current source until the voltage increases to the second reference voltage at a second time;

means for disconnecting the capacitance from the first reference voltage; and means for connecting the capacitance to the current source after the capacitance is disconnected from the first reference voltage.

13. The apparatus of claim 12, wherein the means for timing comprises means for measuring a time period required for the sense voltage to increase from the first reference voltage to the second reference voltage.

14. The apparatus of claim 13, further comprising means for measuring a reciprocal of the time period required for the sense voltage to increase from the first reference voltage to the second reference voltage.

* * * * *